June 23, 1942.  A. C. PURPURA  2,287,571
COFFEE MAKER
Filed July 26, 1941  2 Sheets-Sheet 1
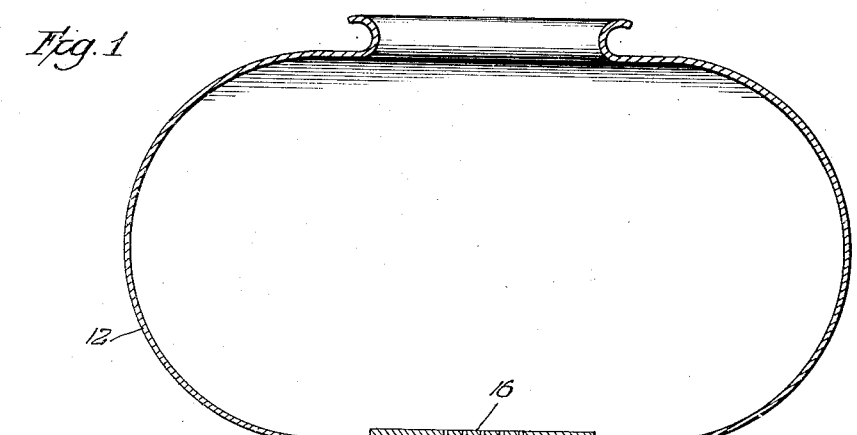
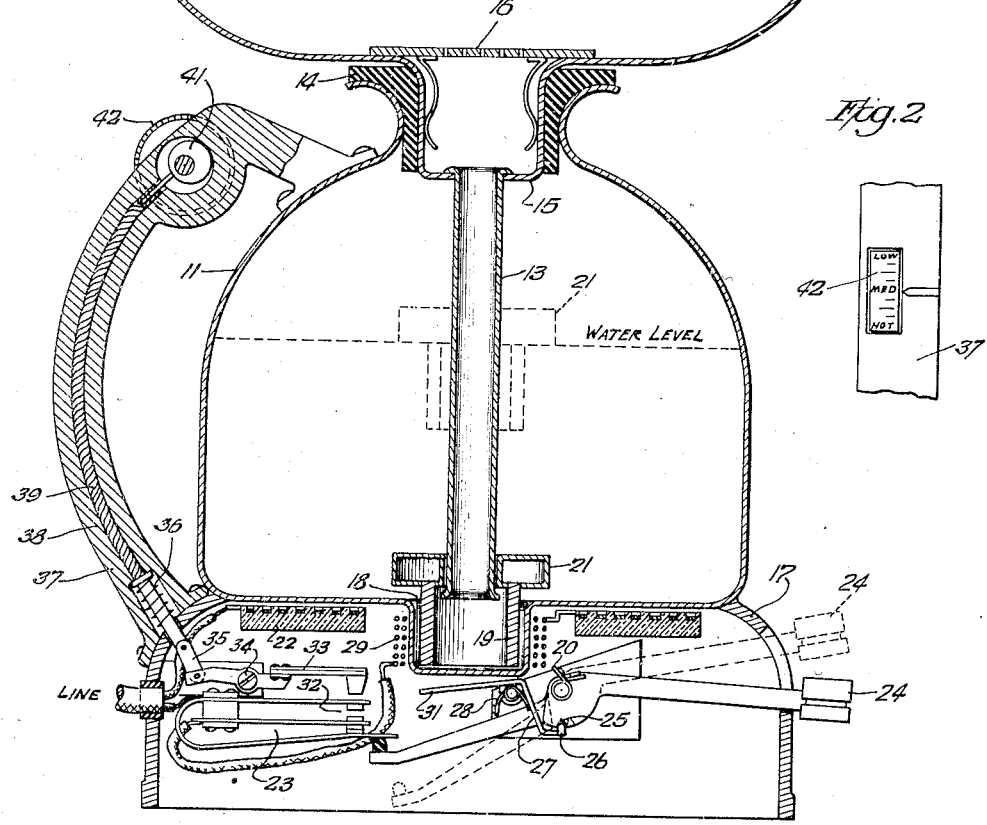
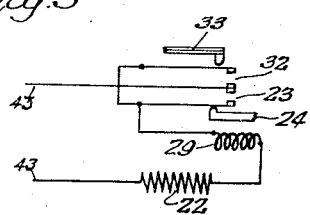
Inventor
August C. Purpura
By Alois W. Graf
Atty.

June 23, 1942.     A. C. PURPURA     2,287,571
COFFEE MAKER
Filed July 26, 1941     2 Sheets-Sheet 2

Inventor:
August C. Purpura
BY
Alois W. Graf
Atty.

Patented June 23, 1942

2,287,571

UNITED STATES PATENT OFFICE 2,287,571

COFFEE MAKER

August C. Purpura, Chicago, Ill., assignor to General Electric Company, a corporation of New York Application July 26, 1941, Serial No. 404,133

11 Claims. (Cl. 219—43)

My invention relates to coffee makers, and more particularly to beverage brewers of the type having a lower chamber and an upper chamber connected thereto so that when heat is applied to the lower chamber fluid is forced therefrom into the upper chamber.

Heretofore beverage brewers and coffee makers of the type having a lower chamber and an upper chamber have found considerable favor with the people, but frequently due to inattention the user does not promptly shut off the power supplying heat to the device thereby permitting the lower chamber to run dry. In order to overcome this disadvantage it has been proposed to provide some arrangement for shutting off the power supplying heat whenever substantially all of the water in the lower chamber has been forced up into the upper chamber. One such means relies on an increase in the pressure within the lower chamber in order to actuate means to cut off current supply in the heating unit. Another arrangement for disconnecting the power from the heating unit utilizes a thermostat arrangement which is responsive to an increase in the heat of the lower unit above a predetermined amount. In these arrangements there appears to be a certain relation between the responsive means and the level of water remaining in the lower chamber, but such devices are not always as positive in operation as would be desirable. Accordingly, in accordance with my invention I provide means which is directly responsive to the level of the water in the lower chamber to disconnect the heating unit from the source of power whenever the liquid in the lower unit drops to a predetermined level.

It is therefore an object of my invention to provide a new and improved beverage brewer or coffee maker which will overcome certain disadvantages found in the arrangements of the prior art and which will be simple and reliable in operation.

It is another object of my invention to provide a new and improved beverage brewer having means directly responsive to a predetermined level of fluid for disconnecting the heating unit from the beverage brewer.

Still another object of my invention is to provide a new and improved beverage brewer having means for maintaining the brewed beverage at a predetermined temperature.

Other and further objects of my invention will become more readily apparent by reference to the following description taken in connection with the accompanying drawings wherein, Figure 1 shows a preferred embodiment of my invention in a beverage brewer;

Figure 2 is a partial view of the means for manually predetermining the temperature at which the brewed beverage is to be maintained;

Figure 3 illustrates one type of electrical circuit which may be utilized with the apparatus shown in Figure 1;

Figure 4:
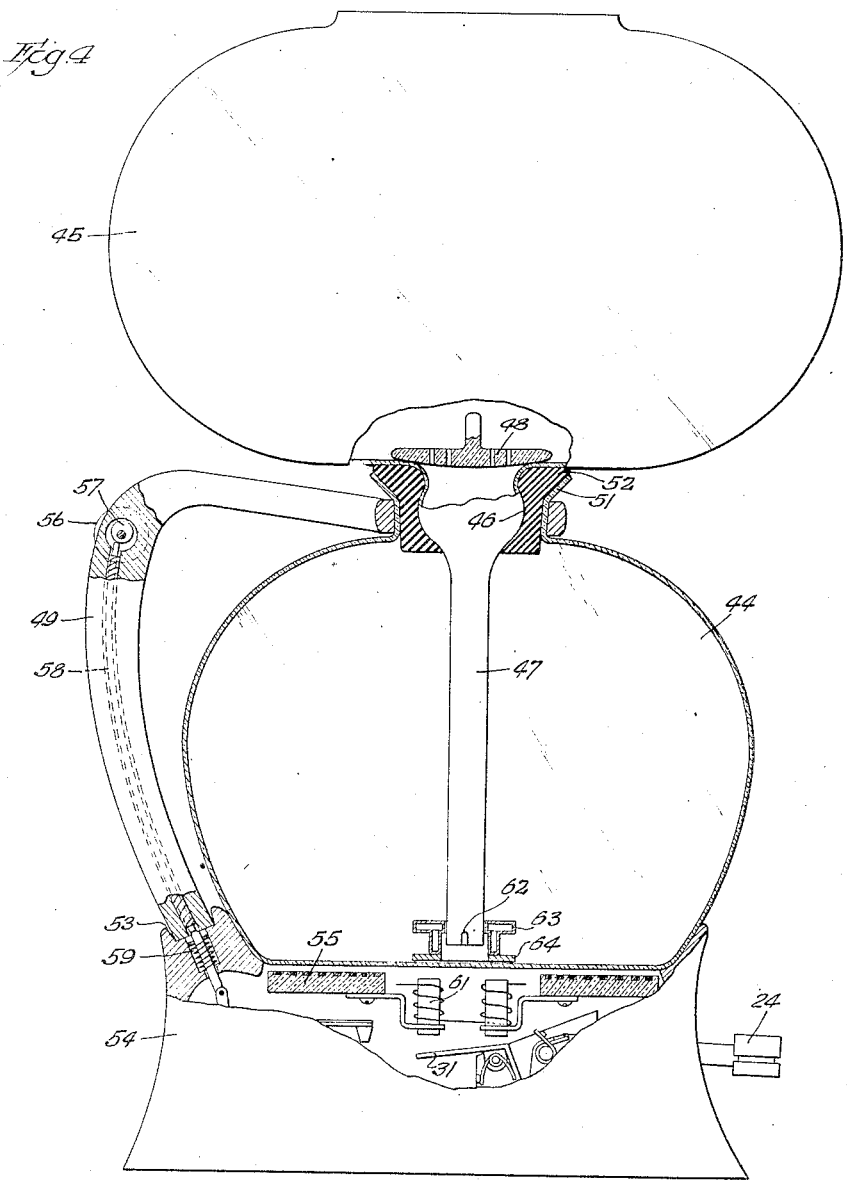
Figure 4 shows a beverage brewer incorporating certain modifications which may be made in accordance with my invention.

Referring more particularly to Figure 1 there is shown a beverage brewer having a lower chamber 11 and an upper chamber communicating therewith by means of a tube 13 extending into the lower chamber sufficiently so that the end thereof is in the proximity of the bottom of the lower chamber. The upper chamber 12 is generally supported within an opening at the top of the lower chamber 11 by means of a supporting and sealing gasket 14 which provides a reasonably tight air seal between the adjacent parts of the upper and lower chambers. Interposed between the bottom of the upper chamber 12 and the tube 13 which extends toward the bottom of the lower chamber 11 there is provided a funnel-like portion 15. The funnel-like portion 15 which is supported upon the gasket 14 may be provided with suitable filter means 16 which are placed therein to keep the materials for the beverages, such as coffee grounds and tea leaves, in the upper chamber 12. The lower chamber 11 is preferably made of a non-magnetic material which may be secured to or supported by a suitable base 17. In the center of the bottom of the lower chamber 11 there is provided a well 18 which is arranged to receive at a predetermined low water level the magnetic portion 19 of a float 21, the purpose of which will subsequently become apparent.

The base 17 contains an electrical heating element 22 placed adjacent to the bottom of the lower chamber 11, and an electrical switch 23 connected in series therewith. The electrical switch 23 is biased so as to be normally in open circuit arrangement, and the switch may be closed by manual operation of an arm 24 which is biased to open circuit position by a spring 20. The arm 24 is provided with a notch 25 which is engaged by a detent 26 supported at the end of a lever 27 to retain the arm so as to hold the switch 23 closed. The detent 26 supported on the end of a lever 27 is resiliently biased by a suitable spring 28 so as to be in position to engage the notch 25 of the switch arm 24 whenever this arm is moved to the position shown in the drawing. Connected in circuit with switch 23 there is an electromagnet 29 which is placed so as to surround the well 18 forming a part of the bottom of the lower chamber 11. The electromagnet 29 is so designed as to have a high reluctance flux path so that whenever the float 21 is in such position that the magnetic portion 19 thereof is not in the well 18, the electromagnet 29 does not have sufficient force to attract an armature 31 which is connected to the lever 27 carrying the detent 26 at an extremity thereof. Whenever the water level in the lower chamber reaches a point in the proximity of the bottom of the lower chamber due to pressure having forced liquid into the upper chamber, the magnetic portion 19 of the float 21 will reduce the reluctance of the flux path of the electromagnet 29 sufficiently so that it will have sufficient power to attract the armature 21 thereby actuating the lever 27 to withdraw the detent 26 from the notch 25 of the switch lever 24 thus permitting the switch lever 24 to return to its normal position since it is biased to this position by a suitable spring 20. The lever 24 thereupon returns to the upper position thus permitting the switch 23 to open thereby deenergizing the heating unit 22. The lower chamber 11 thereupon will cool, thus permitting the fluid or brewed beverage in the upper chamber to return to the lower chamber.

In order to maintain the brewed beverage at a desired predetermined temperature there is provided a switch 32 which is operable by a bimetallic element 33. The bi-metallic element 33 is pivotally mounted at 34 so that the position of the bi-metallic element may be adjusted. The pivoted bi-metallic element 33 is adjusted by a plurality of levers 35 which are biased to a certain position by a spring 36 which spring may be located within a portion of a handle 37. The handle 37 in the present instance is secured to the base 17 and to the lower chamber 11. The handle 37 is provided with a hollow tube 38 containing a flexible shaft 39 which may be longitudinally displaced by means of a cam 41 actuatable by a wheel 42. The hand or thumb wheel 42 is provided with suitable indicia and may be set to determine within a certain range the temperature at which the brewed beverage is to be maintained. The arrangement of the thumb wheel 42 and indicia thereupon may be seen more readily by reference to Figure 2. Whenever the temperature of the lower chamber drops, the bi-metallic element 33 will operate to close the switch contacts 32 thereby supplying heat by means of the heating element 22. After a sufficient period of time the heat from the heating element 22 will cause the bi-metallic element to move away from the switch contact 32 thereby again opening the electric circuit.

One form of electrical circuit for operation of the above described beverage brewer or coffee maker is shown in Figure 3. A suitable source of power 43 is arranged to be connected through the switch 23 to the heating unit 22 and to the electromagnet coil 29 which may be arranged either in parallel or in series with the heating unit 22. Whenever the reluctance of the flux path of the electromagnet 29 has been reduced sufficiently, the switch 23 is opened thereby disconnecting the source of power 23 from the electromagnet 29 and the heating unit 22.

Figure 5:
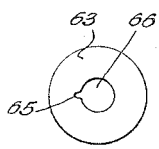
Figure 5 shows a detailed view of one of the parts used in the modification shown in Figure 4.

In the modification shown in Figure 4 there is provided a coffee maker having a lower chamber 44 and an upper chamber 45 each of which may be made of glass or of any non-magnetic material. The upper chamber 45 is provided with a funnel-like portion 46 and a tube 47. The funnel-like portion 46 is arranged to receive a filter means 48, the purpose of which is the same as in the previous embodiment. The lower chamber 44 is provided with a handle 49 which is secured about the neck 51 of the lower chamber 44. The neck 51 supports a sealing gasket 52 which closes the opening between the neck 51 and the funnel-like portion 46 of the upper chamber. The handle 49 extends down to a socket 53 formed in a base 54 which supports a heating unit 55. The handle 49 is provided with a thumb wheel 56 which operates a cam 57 which in turn engages a flexible cable 58 contained within a passage in the handle. The flexible cable is arranged to protrude from the end of the handle 49 so as to engage the end of a lever arrangement 59 which is connected to suitable thermostatic switch operating means similar to the thermostat 33 and the switch 32 shown in Figure 1. The base 54 is furthermore provided with a suitable switch corresponding to switch 23 of Figure 1 and switch operating means corresponding to the arm 24 of Figure 1. In the present arrangement, however, the armature of the lever having a projection engaging a detent on the manually operable switch arm is actuated by a two-coil electromagnet 61 which is positioned so as to be in substantial alignment with the lower end of the tubular portion 47 extending from the upper chamber 45 into the lower chamber 44. The tubular portion 47 is provided with a projection 62 which serves to retain in position on the tubular portion 47 a float 63 having a magnetic ring 64. The float 63 is preferably circular in shape as may be seen from Figure 5 and the upper portion is provided with a notch 65 in the center opening 66 so that the float 63 may be attached to the tubular portion 47 of the upper chamber 45 and yet may be readily removed therefrom for cleaning purposes. The two electromagnet coils 61 which are arranged in bipolar relationship do not have sufficient power to attract the armature of the switch operating means as long as the float 63 is in the upper portion of the lower chamber 44. Whenever the fluid in the lower chamber 44 reaches a certain predetermined minimum level, the float 63 is in such position that the magnetic ring or washer 64 substantially completes one-half of the flux path for the bipolar electromagnet 61 so that the magnet now has sufficient power to attract to it the armature thereby disconnecting the power from the heating unit 55.

It will be seen from this that in the present modification there is provided an electromagnet having a high reluctance flux path as was done in the arrangement shown in Figure 1, and that whenever the level of the fluid in the lower chamber reaches a predetermined minimum level, the reluctance of the electromagnet flux path is reduced sufficiently to actuate means operating to disconnect electrical power from the heating unit. In the latter modification the lower chamber 44 may be removed from the base 54 as is done with many of the present coffee makers not having any means or arrangement for automatically disconnecting the electric power when substantially all of the fluid has been forced from the lower chamber into the upper chamber.

While I have shown and described my invention with certain specific embodiments, it, of course, will be apparent to those skilled in the art that certain modifications may be made in the instrumentalities employed and in the circuit arrangement without departing from the spirit and scope of my invention as set forth in the appended claims.

What I claim as new and desire to secure by Letters Patent of the United States is:

1. A beverage brewer having a lower chamber for liquid, an upper infusion chamber communicating with said lower chamber, means for electrically heating said lower chamber to force fluid therefrom into said upper infusion chamber, a switch connected to control said heating means, said switch being biased toward open circuit position, a catch for retaining said switch in closed circuit position and an electromagnet adapted to operate said switch catch, said electromagnet having a flux path of a predetermined reluctance, and means responsive to a predetermined minimum level of fluid in said lower chamber for reducing the reluctance of the flux path of said electromagnet sufficiently to cause it to operate said switch catch to release said switch to open circuit position.

2. A coffee maker having a lower chamber for liquid, an upper infusion chamber having a tube extending into said lower chamber, means for electrically heating said lower chamber to force fluid therefrom into said upper infusion chamber, a switch connected to control said heating means, an electromagnet arranged to operate said switch to open circuit position, said electromagnet being located in alignment with said tube and having a high reluctance flux path, and float means, retained in position by said tube, responsive to a predetermined minimum level of fluid in said lower chamber for reducing the reluctance of the flux path of said electromagnet.

3. A coffee maker having a lower chamber for liquid, an upper infusion chamber having a tube extending into said lower chamber, means for electrically heating said lower chamber to force fluid therefrom into said upper infusion chamber, a switch connected to control said heating means, an electromagnet arranged to operate said switch to open circuit position, said electromagnet having a high reluctance flux path, and float means positioned by said tube and responsive to a predetermined minimum level of fluid in said lower chamber for reducing the reluctance of said flux path of said electromagnet sufficiently to cause it to operate said switch.

4. A beverage brewer having a lower chamber of non-magnetic material connected to an upper infusion chamber by means of a tube extending therefrom into said lower chamber in the proximity of the bottom thereof, electrical heating means for said lower chamber, a switch connected in series with said heating means, and an electromagnet arranged under the bottom of said lower chamber in proximity to said tube, said electromagnet having a high reluctance flux path and being arranged to operate said switch to open the circuit to said heating means, and a float surrounding said tube, said float supporting a member of magnetic material to cause operation of said switch when the fluid in said lower chamber has reached a predetermined minimum level.

5. A beverage brewer having a lower chamber connected to an upper infusion chamber by means of a tube extending therefrom into said lower chamber to the vicinity of the bottom thereof, electrical heating means for said lower chamber for forcing fluid therefrom into said upper chamber, a switch connected in series with said heating means, an electromagnet arranged under the bottom of said lower chamber in proximity to said tube, said electromagnet having a flux path of predetermined reluctance and being arranged to operate said switch, and a float surrounding said tube, said float supporting a member for changing the reluctance of said electromagnet to cause operation of said switch to open circuit position when the fluid in said lower chamber has reached a predetermined minimum level.

6. A beverage brewer having a lower chamber of non-magnetic material connected to an upper infusion chamber by means of a tube extending therefrom into said lower chamber in the proximity to the bottom thereof, electrical heating means for said lower chamber, a switch connected in series therewith, and electromagnet arranged under said lower chamber in the proximity of the end of said tube, said electromagnet having a high reluctance flux path and being arranged to open said switch, a float surrounding said tube, said float supporting a member of magnetic material for reducing the reluctance of said electromagnet when fluid in said lower chamber has reached a predetermined minimum level, and a thermostatic switch connected in parallel with said first switch to maintain the fluid in said lower chamber at a predetermined temperature.

7. A coffee maker having a lower chamber of non-magnetic material connected to an upper infusion chamber by means of a tube extending therefrom to the proximity of the bottom of said lower chamber, electrical heating means adjacent said lower chamber, a switch connected in series therewith, a pair of electromagnet coils arranged in bipolar relation and positioned adjacent the center of said lower chamber, said electromagnet coils having air paths adjacent each end, a float surrounding said tube, said float supporting a closed ring of magnetic material for reducing the reluctance of one of said air paths of said electromagnet when fluid in said lower chamber has reached a predetermined level, and an armature located within said other air path of said electromagnet for operating said switch to open circuit position.

8. A beverage maker having a lower chamber of non-magnetic material connected to an upper chamber by means of a tube extending therefrom to the proximity of the bottom of said lower chamber, electrical heating means for said lower chamber, a switch for controlling said heating means, an electromagnet arranged adjacent the center of the bottom of said lower chamber, said electromagnet having a high reluctance flux path, an armature for said electromagnet arranged to operate said switch, a float surrounding said tube and supporting a member of magnetic material for reducing the reluctance of said electromagnet flux path when fluid in said lower chamber reaches a predetermined minimum level thereby to actuate said armature, adjustable thermostatic means for maintaining fluid in said lower chamber within a predetermined range of temperatures, a handle connected to said lower chamber, and adjustable thumb wheel and cam carried by said handle, and means interconnecting said cam and said thermostatic means whereby said thermostatic means may be adjusted for a predetermined temperature.

9. A coffee maker having a non-magnetic lower chamber for heating liquid, an upper infusion chamber supported thereupon, said infusion chamber being connected thereto by a tube extending to the proximity of the bottom of said first chamber, electrical heating means for said first chamber, a switch connected in series with said heating means, a magnet having an armature arranged upon attraction thereof to cause said switch to be moved to open circuit position, said magnet having a high reluctance flux path adjacent the bottom of said first chamber in the proximity of the end of said tube, and a float member guided in its travel by said tube and supporting a member of magnetic material for reducing the reluctance of said flux path whenever the liquid in said first chamber has been forced into said infusion chamber so that a predetermined minimum level of fluid remains in said first chamber, said magnet thereupon operating to attract its armature to cause operation of said switch.

10. A beverage brewer having a lower chamber of non-magnetic material, a handle connected to said chamber; said handle having an adjustable thumb wheel, a cam and flexible shaft means actuated by said cam; a stand for said chamber having electrical heating means for heating liquid in said chamber, a switch connected in series with said heating means, a thermostatic switch connected in parallel with said first switch, a socket for receiving the end of the handle of said chamber, said thermostatic switch being arranged to be controlled by said flexible shaft means mounted in said handle, a magnet mounted in said base so as to have a high reluctance flux path in the proximity of the base of said chamber, an armature for said magnet for actuating said first switch to open circuit position; an infusion chamber supported by said lower chamber and being connected thereto by a tube extending into said lower chamber in the proximity of the bottom thereof, and a float positioned in its travel by said tube, said float having a magnetic material for reducing the reluctance of said flux path of said magnet sufficiently to cause said magnet to actuate said first switch whenever a predetermined minimum level of liquid is obtained in said lower chamber.

11. A coffee maker having a water heating bowl, a coffee infusion bowl and a liquid transfer tube between said bowls, a heater under said water heating bowl, an armature and a magnet associated therewith, one member of said armature and magnet being mounted for movement in said bowl and the other member mounted in a fixed position outside of said bowl, the magnetic flux between said armature and magnet being varied when said one member is moved relatively to said other member so as to vary an operating condition of said other member, means for moving said one member relative to said other member to vary said flux responsively to the transfer of water from said water heating bowl to said coffee infusion bowl, and means operated responsively to the variation in said operating condition of said other member to reduce the heat applied to said water heating bowl when substantially all of the water has been transferred therefrom to said coffee infusion bowl.

AUGUST C. PURPURA.